Feb. 27, 1968    J. G. SALVATI ET AL    3,371,296
CIRCUIT BREAKER AND MOTOR OPERATOR
Filed July 14, 1965    3 Sheets-Sheet 1

WITNESSES:
John L. Chopp
James F. Young

INVENTORS
John G. Salvati and
Louis N. Ricci
BY
William A. Elchik
ATTORNEY

Feb. 27, 1968   J. G. SALVATI ET AL   3,371,296
CIRCUIT BREAKER AND MOTOR OPERATOR
Filed July 14, 1965                    3 Sheets-Sheet 2
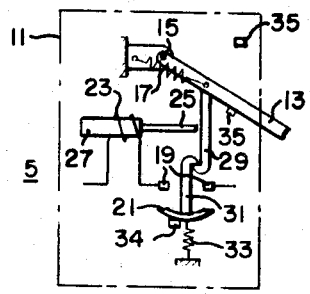
FIG. 3.
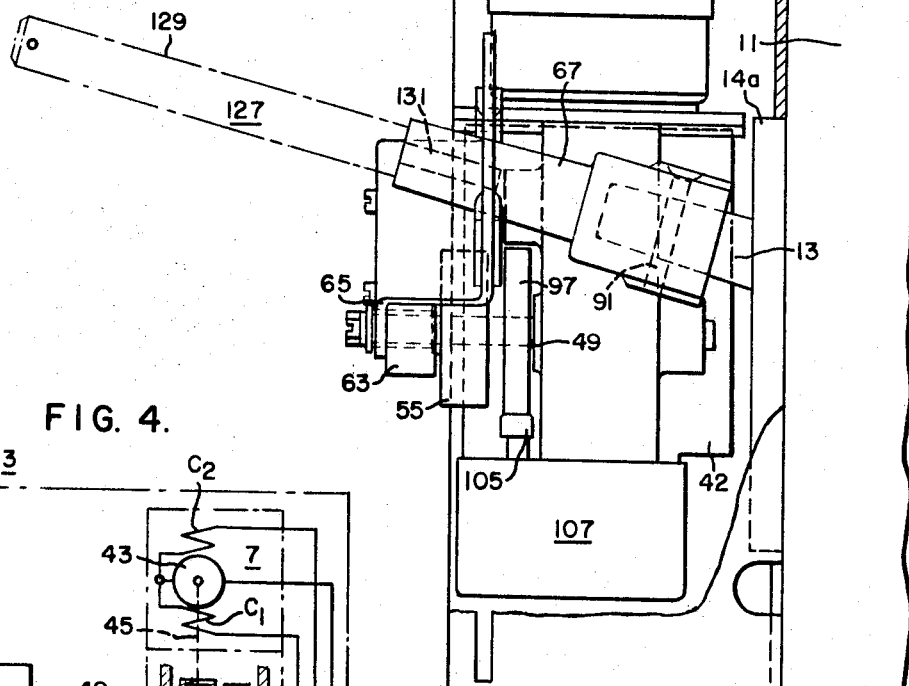
FIG. 2.
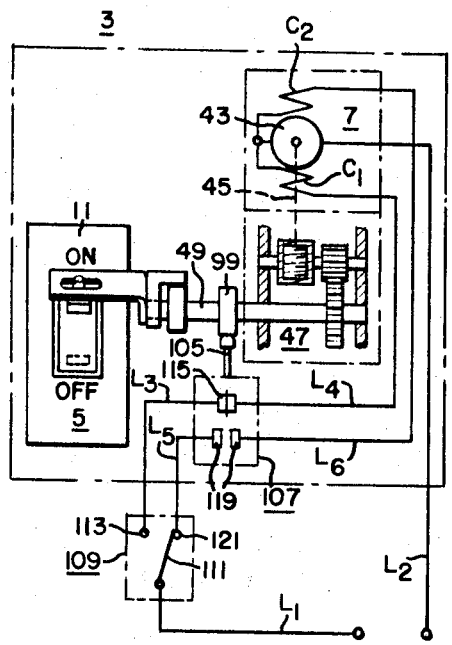
FIG. 4.
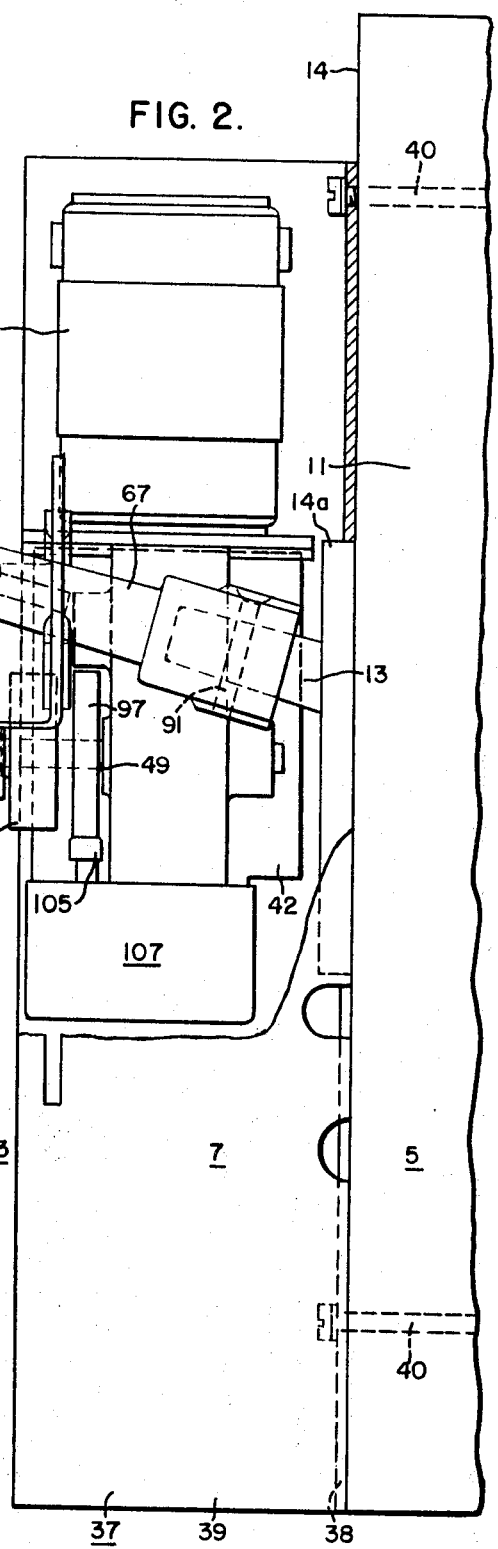

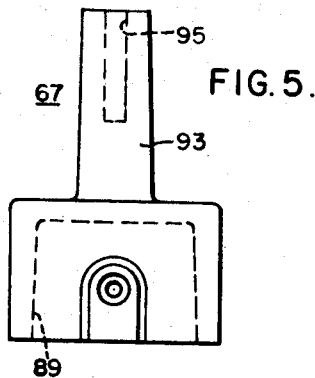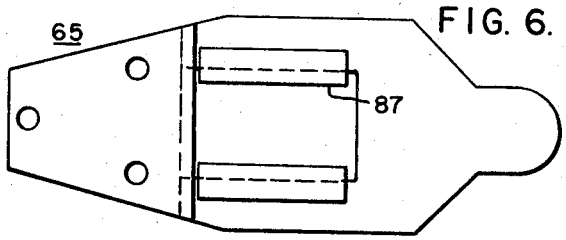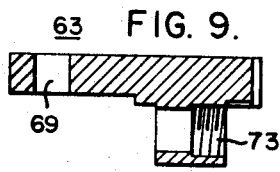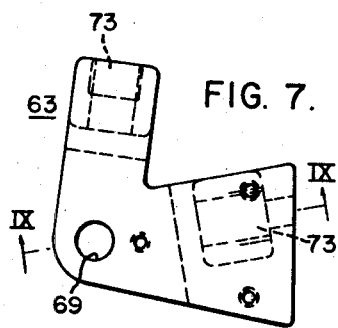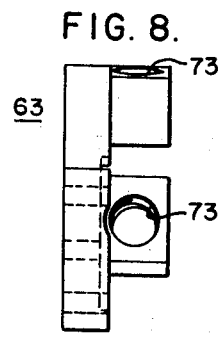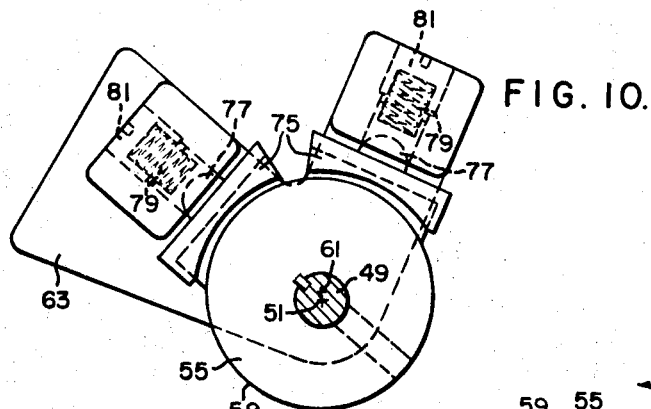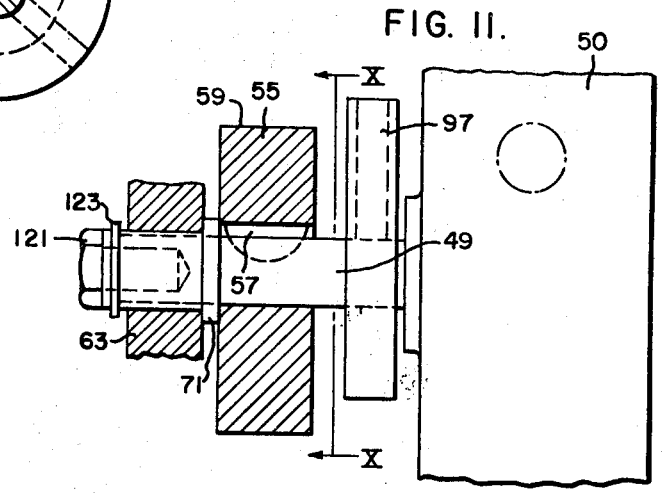

United States Patent Office 3,371,296
Patented Feb. 27, 1968

3,371,296
CIRCUIT BREAKER AND MOTOR OPERATOR
John G. Salvati, Patterson Township, Beaver Falls, and Louis N. Ricci, Chippewa Township, Beaver Falls, Pa., assignors to Westinghouse Electric Corporation, Pittsburgh, Pa., a corporation of Pennsylvania
Filed July 14, 1965, Ser. No. 471,825
6 Claims. (Cl. 335—74)

This invention relates generally to circuit interrupting apparatus and more particularly to circuit interrupting apparatus of the type comprising a circuit breaker and a motor operating mechanism for operating the circuit breaker.

A general object of this invention is to provide an improved circuit interrupting device comprising a circuit breaker and a motor operating mechanism operatively connected to the circuit breaker.

Another object of this invention is to provide a circuit interrupting device comprising a molded-case type circuit breaker and a compactly constructed motor operating mechanism mounted on the front of the circuit breaker.

Another object of this invention is to provide an improved circuit interrupting device comprising a circuit breaker and a motor operating mechanism operatively connected to the circuit breaker for motor operations of the circuit interrupting device which device comprises improved means permitting manual operation thereof.

Another object of this invention is to provide an improved circuit interrupting device comprising a variable-friction type motor operating mechanism.

A further object of this invention is to provide an improved circuit interrupting device comprising a circuit breaker having an operating member and a motor operating mechanism operatively connected to the operating member which motor operating mechanism comprises a variable-friction type driving means with means for permitting adjustment of the frictional force characteristics whereby the mechansim can be used to effectively operate various types of circuit breakers without damaging the operating members of the circuit breakers.

The novel features which are considered characteristic of the invention are set forth in particular in the appended claims. The invention itself, however, both as to structure and operation, together with additional objects and advantages thereof, will be best understood from the following detailed description of a preferred embodiment thereof when read in conjunction with the accompanying drawings.

In said drawings:

FIG. 2 is a side elevational view, with parts broken away, of the circuit interrupting device illustrated in FIG. 1;

FIG. 3 is a schematic view of parts of the circuit breaker seen in FIGS. 1 and 2;

FIG. 4 is a schematic view of the device seen in FIGS. 1 and 2 illustrating the control circuits for the device;

FIG. 5 is an end elevational view of the handle attachment seen in FIGS. 1 and 2;

FIG. 6 is a top plan view of the operating arm seen in FIGS. 1 and 2;

FIG. 7 is a top plan view of the driven arm member seen in FIGS. 1 and 2;

FIG. 8 is a side view of the driven arm member disclosed in FIG. 7;

FIG. 9 is a sectional view taken generally along the line IX—IX of FIG. 7;

FIG. 10 is a sectional view taken generally along the line X—X of FIG. 11; and

FIG. 11 is a view, with parts broken away, showing the operating shaft and parts connected thereto.

Figure 1:
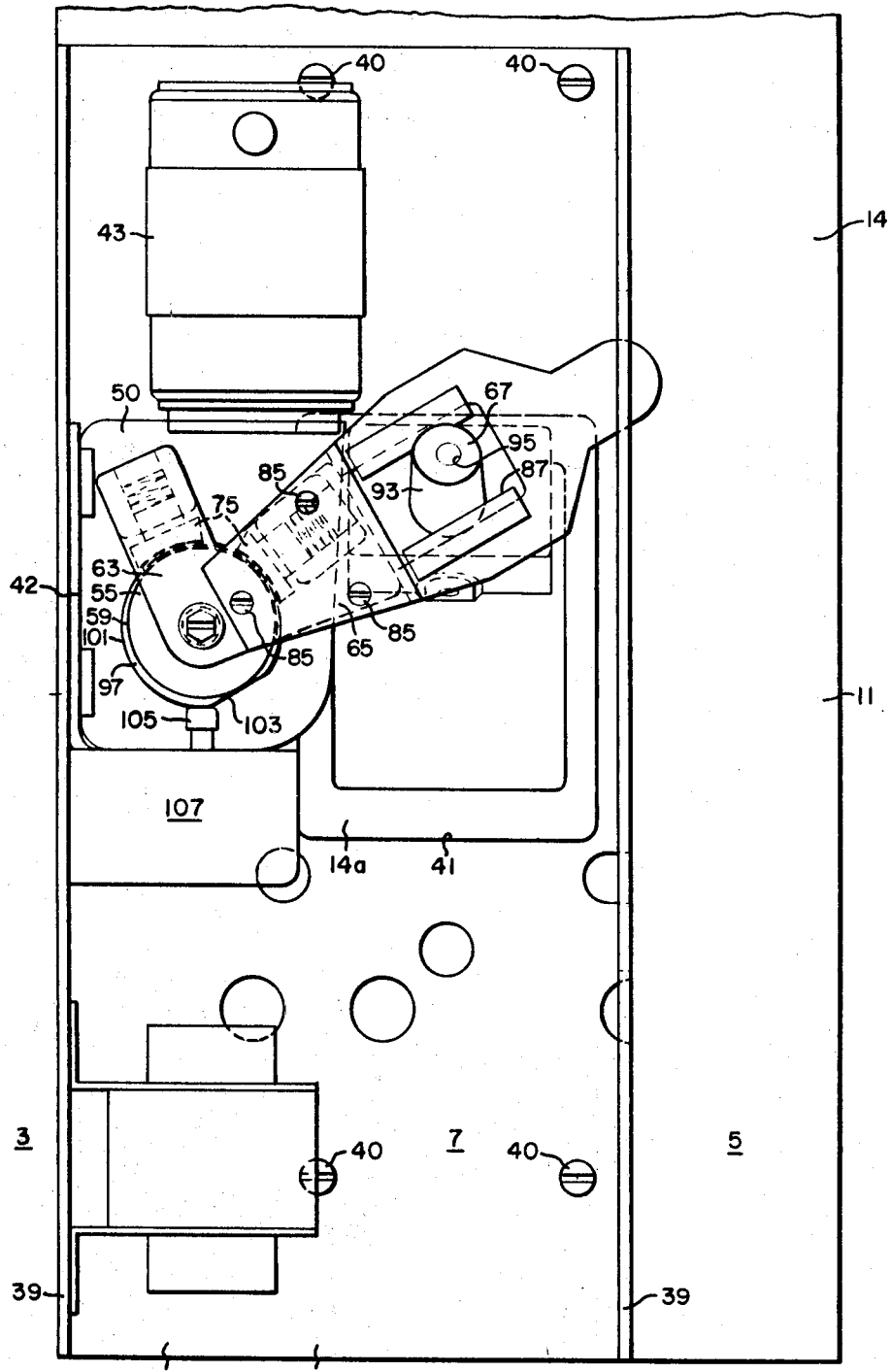
FIGURE 1 is a plan view of part of a circuit interrupting device constructed in accordance with principles of this invention.

Referring to the drawings and particularly to FIGS. 1 and 2, there is shown therein a circuit interrupting device 3 comprising a circuit breaker 5 and a motor-operating mechanism 7. The circuit breaker 5 is of the type known in the art as a molded-case type circuit breaker since it comprises an insulating housing 11 of molded insulating material and an insulating operating handle 13 that extends out through a suitable opening means in the front or top 14 of the insulating housing. The handle 13 is manually movable between two operating positions to open and close contacts within the housing 11. The front 14 of the housing 11 comprises a generally planar front surface having a raised portion 14$_A$ which raised portion 14$_A$ has an opening therein through which the handle 13 protrudes. As is shown schematically in FIG. 3, the handle 13 is moved about a pivot 15 to move a spring 17 over-center to effect opening and closing of the contacts 19, 21 in a well known manner. When the contacts 19, 21 are in the closed position and an overload current passes through the coil 23, a plunger 25 of a solenoid 27 is moved to pivot a latch member 29 to unlatch a contact arm 31 that carries the movable contacts 21 whereupon a spring 33 operates to open the contacts 19, 21. The contact 21 is stopped in the open position by means of a stop 34. The circuit breaker is reset by moving the handle 13 to the full "off" position to relatch the lever 29 with the contact arm 31. The circuit breaker is trip-free in that if the handle 13 is held in the closed position the circuit breaker will still be tripped open upon the occurrence of an overload current through the breaker.

Stop means 35 are provided to limit movement of the handle in both directions. The circuit breaker is of the general type disclosed in the patent to G. G. Grissinger et al., Patent No. 2,586,326; and of the specific type disclosed in the application of Albert R. Cellerini et al., Ser. No. 305,792, filed Aug. 30, 1963. Thus, only a schematic drawing and brief description of the circuit breaker is given herein.

The motor-operating mechanism 7 comprises a rigid generally U-shaped metallic support member 37 comprising a base 38 and oppositely disposed side walls 39. The base 38 is secured to the generally planar front 14 of the insulating housing circuit breaker 11 by means of screw members 40. The base 38 of the support 37 is provided with an opening 41 therein through which the part 14$_A$ of the insulating housing 11 protrudes. A motor support plate member 42 is rigidly secured to one of the legs or side wall members 39 of the support 37 by suitable securing means. The motor-operating mechanism 7 comprises a reversible motor 43 operating through an output shaft 45 (FIG. 4) to drive a gear apparatus 47 to thereby rotate an operating shaft 49. The motor 43 is suitably secured to a gear box housing 50, which housing 50 is in turn suitably secured to the motor support 42 to support the motor and gear box structure on the side wall 39 of the support member 37. The operating shaft 49 is rotatable about an axis 51 (FIG. 10). A driving friction cam member 55 (FIGS. 10 and 11) is mounted on the shaft 49, and a key portion 57 on the driving friction member 55 is disposed in a suitable slot in the shaft 49 to secure the driving friction member 55 to the shaft 49 for common rotation with the shaft 49. The member 55 comprises a member having an external friction surface 59 thereon that is generally circular about a center point 61 (FIG. 10). As is illustrated in FIG. 10, the driving member 55 is mounted eccentrically on the shaft 49. The center point or axis of the shaft 49 is shown at 51 in FIG. 10, and the center point of the circular periphery or friction surface 59 of the driving member 55 is shown at 61. The driving friction member 55 is operated to drive a driven arm 63 to thereby operate an operating arm 65 (FIG. 6) that is operatively connected to a handle member 67.

Referring to FIGS. 7–10, the driven arm 63 comprises a metallic member having an opening 69 therein that receives the operating shaft 49 loosely such that the driven arm 63 can rotate on and relative to the operating shaft 49. A bearing 71 (FIG. 11) is disposed on the operating shaft 49 between the driving member 55 and the driven arm 63. The driven arm 63 comprises two arm portions each of which is provided with an opening 73 that is tapped at the outer end thereof. A separate brake shoe structure 75 is disposed at the lower end of each of the openings 73. A part 77 of each brake shoe structure 75 is disposed at the lower end of the associated opening 73 to retain the structure 75 in place. Each of the brake shoe structures 75 is provided with a lower brake surface of asbestos or other suitable braking material, which surface is shaped to mate with the outer surface 59 of the driving cam 55. A separate spring member 79 (FIG. 10) is disposed in each of the openings 73 and biased into engagement with the associated brake shoe structure 75 by means of a threaded member 81 that is screwed into the outer part of the associated opening 73. The threaded members 81 can be rotated to move up or down in the associated openings 73 to thereby increase or decrease the amount of spring force biasing the friction shoes 75 against the friction surface 59. Thus, the friction between the friction shoes 75 and the friction surface 59 can be adjusted.

The operating arm 65 (FIG. 6) is fixedly secured to the driven arm 63 by means of three screws 85 (FIG. 1) that pass through openings in the operating arm 65 and that are threaded into suitable tapped openings in the driven arm 63. The driven arm 63, and the parts mounted thereon including the friction shoes 75 and operating arm 65, can be termed an operating arm structure or a driven friction device that cooperates with the driving member 55 and the handle 67 to operatively connect the shaft 49 with the handle 67. The operating arm 65 is provided with an opening 87 therein, and when the motor operating mechanism 7 is in position, the handle member 67 extends through the opening 87 whereby the operating arm 65 and handle member 67 are operatively connected.

Referring to FIGS. 1, 2 and 5, the handle member 67 is a molded insulating member having a lower opening 89 therein that receives the handle 13 of the circuit breaker. A suitable screw member 91 (FIG. 2) passes through opening means in the members 67, 13 to secure the members 67, 13 fixedly together. The upper part 93 of the handle member 67 passes through the opening 87 of the operating arm 65 to provide an operative connection between the members 67, 65. An opening 95 (FIGS. 1 and 5) is provided in the upper end of the part 93 for a reason to be hereinafter set forth. The handle 13 and handle member 67 comprise a hanlle structure movable as a unit to effect operation of the circuit breaker contacts in the same manner hereinbefore described.

Referring to FIG. 11, it will be seen that a switch cam member 97 is fixedly secured to the operating shaft 49 for unitary rotation with the shaft 49. As can be seen in FIG. 1, the switch cam 97 comprises an upper cam surface 101 and a lower flat cam surface 103. The cam member 97 is positioned to operate a plunger 105 of a switch member 107 that is fixedly mounted on the plate 37. The switch member 107 has two sets of reversible contacts therein for a purpose to be hereinafter described. The plunger 105 of the switch member 107 is spring biased against the cam surface 101, 103 of the cam member 97.

Referring to FIG. 4, when the circuit interrupting device 3 is mounted and wired for operation, two lines $L_1$ and $L_2$ are connected to a suitable power source. A switch indicated generally at 109 is connected to operate the apparatus. The circuit interrupting device is disclosed with the circuit breaker 5 in the "on" position. In order to open the circuit breaker a switch arm 111 of the switch 109 is moved into engagement with a contact 113 to close a circuit from $L_1$ through the switch arm 11, contact 113, a line $L_3$, a pair of closed contacts 115 of the switch 107, a line $L_4$, a motor coil $C_1$ of the reversible motor 43, to the line $L_2$. This energizes the reversible motor 43 to rotate the operating shaft 49 to thereby rotate the driving friction member 55 and switch cam 97. As can be seen in FIG. 11, a bolt member 121 and washer member 123 are secured to the outer end of the shaft 49 to maintain the driven arm 63 on the shaft 49. The above set forth energization of the motor 43 rotates the operating shaft 49 driving member 55 and cam 97 in a clockwise (FIG. 1) direction. When the eccentrically mounted driving member 55 is rotated clockwise the friction surface 59 initially slides against the friction shoes 75 and as a part of the friction surface 59 that is a greater dimension from the center of the axis of the operating shaft 49 moves into engagement with the friction shoes 75 the friction shoes 75 are moved outward additionally charging the compression springs 79 to thereby increase the force that biases the friction shoes 75 against the driving friction surface 59. It is well known that the friction between two surfaces is proportional to the force pressing the surfaces together. During this rotation, therefore, the force of the springs 79 pressing the friction shoes 75 into engagement with the friction surface 59, will increase the friction between the shoes 75 and the surface 59 until these members grab, whereupon further rotation of the driving friction member 55 will move the driven friction shoes 75 and, therefore, the driven arm 63 and operating arm 65 clockwise (FIG. 10). Because of the operative engagement between the operating arm 65 and the handle member 67, the handle member 67 and handle 13 of the circuit breaker 5 are moved to open the contacts of the circuit breaker 5. The circuit breaker is constructed such that when the overcenter spring is moved overcenter the mechanism will be moved to the operating position with a snap action independent of the movement of the handle 13 in a manner well known in the art. Thus, though the handle 13 is moved at the speed of the rotating operating shaft 49, the mechanism within the circuit breaker will be rapidly moved to the open and closed positions when the overcenter spring within the mechanism moves over a center line. When the handle structure 13, 67 reaches its extreme operating position, the handle structure is stopped by stop means (see schematically at 35 in FIG. 3) whereupon the friction surfaces between the friction shoes 75 and the surface 59 of the driving member 55 will break away and the driving friction member 55 will slip against the friction surfaces of the friction shoes 75 as the driving member 55 moves relative to the driven arm 63 until the driving member is stopped in a manner to be hereinafter described. This slipping action prevents the application of a damaging force to the handle structure 13, 67 and to the internal mechanism of the circuit breaker during motor operations.

The energizing circuit is automatically opened when the flat portion 103 (FIG. 1) of the cam member 55 passes the plunger 105 of the switch 107 to open the contacts 115 (FIG. 4) and close a pair of contacts 119 preparing the circuit for a closing operation. After the motor 43 has been deenergized, the driving friction member 55 and switch cam 97 will be rotated with the shaft 49 until the inertia of the motor 43 and gears 47 have been spent. The braking action between the brake shoes 75 and surface 59, and the braking action of the motor 43 and gears 47, is such that the operating shaft 49 and the driving friction member 55 will be stopped at a position wherein the periphery of the friction surface 59 engages the brake shoes 75 at a low area or at an area wherein the distance between the center of the shaft 49 and the periphery 59 is lessened. Thus, the parts are stopped at a position wherein there is less frictional force between the surface 59 and the brake shoes 75.

Thereafter, when it is desired to move the handle structure 13, 67 to close the circuit breaker, the switch arm 111 is moved out of engagement with the contact 113 and into engagement with a contact 121. This closes a circuit through $L_1$, the switch arm 111, the contact 121, a line $L_5$, the contacts 119, a line $L_6$, a motor coil $C_2$ to the line $L_2$. Energization of the motor coil $C_2$ operates to operate the operating shaft 49 in the opposite or counterclockwise (FIG. 1) direction. During this movement, the driving friction member 55 is rotated to initially slip against the friction shoes 75. During this movement, the biasing force of the springs 79 is increased to increase the friction between the shoes 75 and surface 59 until the surfaces grab whereupon the driving friction member 55 operates to rotate the drive arm 63 unitarily therewith to thereby move the operating arm to operate the handle structure 13, 67 to the "on" position. During this movement, the operating spring of the circuit breaker is operated to open the contacts of the circuit breaker with a snap action in the same general manner hereinbefore described. During this operation, the flat portion 103 (FIG. 1) of the cam member 97 again passes the plunger 105 of the switch 107 to open the contacts 119 and to simultaneously close the contacts 115 (FIG. 4). This operation interrupts the energizing circuit and prepares the circuit for a subsequent operation. When the handle structure 13, 67 reaches the full "on" position, the handle is stopped by stop means (shown schematically at 35 in FIG. 3), and the friction surfaces between the members 75, 55 breakaway whereupon the driving friction member 55 rotates, with the shaft 49, slipping against the stopped friction shoes 75 to thereby prevent the application of a damaging force to the handle structure 13, 67 and internal parts of the circuit breaker. The braking action of the friction surfaces, motor 43 and gears 47 is such that the parts will be stopped with the friction shoes 75 engaging a low part of the friction surface 59 and with the spring 79 expanded relative to the more charged condition that occurs during the operation so that the parts are again stopped at a position wherein there is less frictional force between the surface 59 and the brake shoes 75.

As is disclosed in FIGS. 1 and 5, the handle member 67 is provided with an opening 95 at the upper part thereof. A tool member 127 (FIG. 2) comprising an upper handle part 129 and a lower rod part 131 of reduced diameter, is provided for manual operation of the circuit breaker 5. The lower part 131 of the member 127 fits into the opening 95 in the handle membre 67 such that the member 127 may be readily moved into and out of the mounted position. When it is desired to manually operate the circuit breaker 5, the member 127 is mounted in the position shown in FIG. 2 and the handle structure 127, 13, 67 is operated between the operating positions. During manual operation, the friction surfaces between the members 75, 55 slip. Since there is relatively less friction between these surfaces because of the relatively expanded condition of the springs 79, it is easier to manually operate the circuit breaker. Manual operation is effected without an operation disconnecting the driven structure 63 from the driving structure 55 and without driving the gears 47 (FIG. 4) of the motor 43. For certain installations, however, when very high frictional force characteristics are required for adequate motor driving operations, the driving member 55, operating shaft 49 and parts connected thereto will be driven through the friction clutch 75, 55 during the manual operations. After manual operations, the member 127 is readily removable by merely lifting the member to move the part 131 thereof out of the opening in the handle member 67.

The motor operating mechanism 7 can readily be adapted to different types of circuit interrupters. For example, various sizes and ratings of circuit breakers of the molded-case type seen in FIGS. 1 and 2 can be readily operated by means of the motor operating mechanism. Since the force necessary to effectively operate the operating handle structure 13, 67 can vary as between circuit breakers of the same rating and also as between circuit breakers having different ratings, the adjusting means comprising the screw members 81 (FIG. 10) is provided to permit adjustment of the biasing force of the springs 79 to thereby permit adjustment of the operating characteristics of the motor operating mechanism.

The motor operating mechanism of this invention is a compact structure. The compact top-mounted mechanism is particularly useful at installations wherein depth space is more readily available than wall space. At some installations, where the required handle operating force is not great, the friction clutch can be adjusted to slip and the motor operating mechanism can be adjusted to run slightly past the handle operating positions thereby providing that there will be adequate handle travel when the motor operating mechanism is mounted on the breaker in the field. At these installations, the clutch can be adjusted such that during manual operation the clutch will slip in the manner hereinbefore specifically described. At certain installations, where the required handle operating force is great, the friction clutch can be adjusted for positive grabbing action without the slipping function. Since more force is transmitted through the friction clutch at these installations, it is desirable at these installations to provide sufficient handle over-travel and to stop the motor operating mechanism within the limits of this handle overtravel so that a handle-damaging force will not be transmitted through the tightened friction clutch. In these cases, provision should be made so that when the handle reaches the desired operating positions, the handle can be moved in additional handle-overtravel distance without engaging rigid stop means.

While the invention has been disclosed in accordance with the provisions of the patent statutes, it is to be understood that various changes in the details thereof may be made without departing from the spirit and scope of the invention. It is desired, therefore, that the language of the appended claims be given the broadest reasonable construction permissible in the light of the prior art.

We claim as our invention:

1. A motor-operating mechanism for operating a circuit breaker of the type comprising an insulating housing having a generally planar front with an operating handle structure extending from the front of said housing and movable between two operating positions to open and close a pair of contacts that are disposed within the housing, said motor-operating mechanism comprising support means adapted to be supported at the front of said housing, said support means comprising a base plate having an opening therein for receiving said operating handle, a motor structure supported on said support means, an operating shaft geared to said motor and operable by operation of said motor structure and rotatable about an axis that is generally normal to the plane of said planar front, a driving friction member mounted on said operating shaft for rotation with said operating shaft, a driven friction device mounted on said operating shaft and rotatable about said axis relative to said operating shaft, said driven friction device comprising a pair of spaced handle-engaging surfaces for receiving said handle structure therebetween to provide an operative connection between said driven friction device and said operating handle structure, said driving friction member and driven friction device comprising friction surfaces engageable to provide a friction clutch structure between said operating shaft and said operating handle structure, and upon energization of said motor said operating shaft operating through said friction clutch structure to operate said driven friction device to thereby operate said operating handle structure when said motor-operating mechanism is mounted on said housing with said driven friction device operatively connected with said operating handle structure.

2. A circuit breaker and a front-mounted type motor-operating mechanism, said circuit breaker comprising an insulating housing having a generally planar front, a pair of cooperable contacts within said housing, an operating handle structure extending from the front of said housing and being movable between two operating positions to open and close said contacts, said motor-operating mechanism comprising support means supported at the front of said housing, a motor structure supported on said support means, an operating shaft geared to said motor and operable by operation of said motor structure and rotatable about an axis that is generally normal to the plane of said front, a driving friction member mounted on said operating shaft for rotation with said operating shaft, a driven friction device mounted on said operating shaft and rotatable relative to said operating shaft about said axis, means connecting said driven friction device with said operating handle structure, said driving friction member and driven friction device comprising friction surfaces engaging to provide a friction clutch structure between said operating shaft and said operating handle structure, and upon energization of said motor said operating shaft operating through said friction clutch structure to operate said operating handle structure from one to the other of said operating positions.

3. The combination according to claim 2, said motor structure comprising a reversible motor, said reversible motor being operable in a first direction to operate said operating handle structure from one of said operating positions to the other of said operating positions, and said reversible motor being operable in a second direction opposite said first direction to operate said operating handle structure from said other operating position to said one operating position.

4. The combination according to claim 2, resilient means biasing said friction surfaces into engagement with each other, and means for adjusting the biasing force of said resilient means to thereby adjust the friction between said friction surfaces.

5. The combination according to claim 3, said friction surfaces comprising a driving friction surface on said driving friction member and a driven friction surface on said driven friction device, means mounting said driven friction surface on said driven friction device for movement toward and away from said driving friction surface, resilient means on said driven friction device biasing said driven friction surface into engagement with said driving friction surface, and adjusting means on said driven friction device adjustable to adjust the biasing force of said resilient means to thereby adjust the friction between said driven friction surface and said driving friction surface.

6. The combination according to claim 5, and said operating handle structure comprising means for receiving a handle extension to permit manual operation of said operating handle structure.

References Cited

UNITED STATES PATENTS

| 3,171,920 | 3/1965  | Klein et al. | 335—69  |
| 3,198,907 | 8/1965  | Archer et al. | 335—69  |
| 3,213,234 | 10/1965 | Soos | 335—74  |
| 3,213,236 | 10/1965 | Pendy et al. | 335—74  |
| 2,264,990 | 12/1941 | Lindstrom et al. | |
| 2,354,135 | 7/1944  | May. | |
| 2,959,649 | 11/1960 | Powell | 200—153 |

OTHER REFERENCES

General Electric Company, "Circuit Breakers Remote Control," 5–1911, Schenectady, N.Y., publication No. 4842, page 5.

BERNARD A. GILHEANY, *Primary Examiner.*

H. E. SPRINGBORN, R. L. COHRS,
*Assistant Examiners.*